(No Model.)

E. C. COLLINS.
SNOW PLOW.

No. 579,424. Patented Mar. 23, 1897.

Witnesses:
Walter E. Lombard.
Geo. A. Sewall.

Inventor:
Edward C. Collins,
by N. C. Lombard,
Atty.

UNITED STATES PATENT OFFICE.

EDWARD C. COLLINS, OF TAUNTON, MASSACHUSETTS, ASSIGNOR TO THE TAUNTON LOCOMOTIVE MANUFACTURING COMPANY, OF SAME PLACE.

SNOW-PLOW.

SPECIFICATION forming part of Letters Patent No. 579,424, dated March 23, 1897.

Application filed January 14, 1897. Serial No. 619,174. (No model.)

*To all whom it may concern:*

Be it known that I, EDWARD C. COLLINS, of Taunton, in the county of Bristol and State of Massachusetts, have invented a new and useful Improvement in Snow-Plows, of which the following, taken in connection with the accompanying drawings, is a specification.

My invention relates to snow-plows; and it consists in certain novel features of construction, arrangement, and combination of parts which will be readily understood by reference to the description of the accompanying drawings and to the claims hereto appended, and in which my invention is clearly pointed out.

Figure 1:
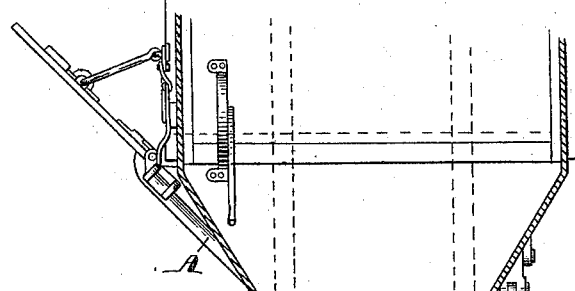
Figures 3, 4:
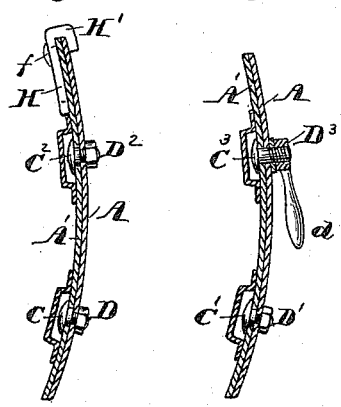
Figure 5:
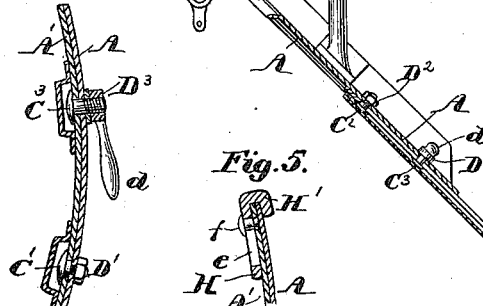
Figure 2:
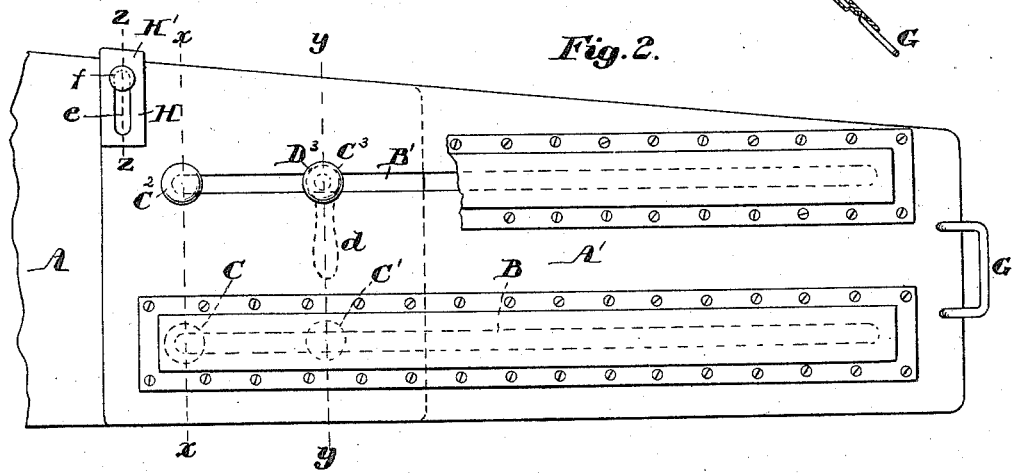

Figure 1 of the drawings is a partial plan of a snow-plow embodying my invention. Fig. 2 is an elevation of a portion of the plowshare drawn to an enlarged scale and illustrating my invention. Fig. 3 is a vertical section on line $xx$ on Fig. 2. Fig. 4 is a similar section on line $yy$ on Fig. 2, and Fig. 5 is a partial vertical section on line $zz$ on Fig. 2.

My invention is an improvement upon the invention shown and described in the Letters Patent No. 536,328, granted to Dean and Mathews March 26, 1895, and has for its object the production of a plowshare adapted to be lengthened or shortened at its forward end for the purpose of increasing or diminishing the width of the path plowed to suit the varying circumstances under which a plow may be used.

In the drawings, A is the main plowshare, supported and operated in substantially the same manner as in said patent before cited, the forward end of said share terminating at $a$.

A' is a detachable and adjustable extension-plate curved transversely to the curve as the main share A and provided with the two longitudinal and parallel slots B and B', extending nearly the whole length thereof, as shown in Fig. 2, partly in full lines and partly in dotted lines.

A pair of headed studs C and C' are passed through the slot B and set firmly in the share A, and a similar stud $C^2$ is passed through the slot B' and firmly set in said share A, said studs C, C', and $C^2$ being clamped to said share by the nuts D, D', and $D^2$ in such a manner as to serve as guides for the extension-plate A' without binding the same. A clamping-bolt $C^3$ is also passed through the slot B' and through a hole in the plate A' and is screwed into the nut $D^3$, provided with the operating-handle $d$, by means of which the plate A' may be firmly clamped to the share A in any desired adjusted position.

F F' are sheet-metal housing secured to the front face of the plate A by suitable screws $b\ b$ in positions to cover the slots B and B' and inclose the heads of the studs C, C', and $C^2$ and the clamping-bolt $C^3$, as shown in Figs. 2, 3, and 4.

The plate A is provided at its outer end with the loop-like handle G, by which said plate may be moved endwise when unclamped to adjust it to the desired position on the share A.

The upper edge of the share A is inclined, its forward end being narrower than its rear end, as shown in Fig. 2 and in said prior patent, and the extension-plate A' is correspondingly inclined and is made of such a width that when extended to the limit of its outward movement its upper edge is in line with the upper inclined edge of the main share A, as shown in Fig. 2. When retracted into a position with its outer end coinciding with the outer end of the main share A, the preponderance of weight of said plate A' inside of the supporting-bolts C, C', $C^2$, and $C^3$ tends to cause the inner end of said plate A' to sag or drop below the line of the lower edge of the main share A. To obviate this tendency, I set in plate A', near its inner upper corner, a headed stud $f$, which passes through a slot $e$ in the plate H, provided at its upper end with a hook H', which extends over and engages the back side of the share A, as shown in Fig. 3.

When the plate A' is extended to its greatest limit, the hook-plate H H' drops so that the stud $f$ is in the upper end of the slot $e$, as shown in Fig. 2, but as the plate A is retracted to its innermost position the hook-plate H H' is moved upward by the inclined upper edge of the share A acting thereon until the lower end of the slot $c$ is in contact with the stud $f$ and the under side of the hook rests upon the upper edge of the share A in an obvious manner.

The operation of my invention will be readily understood from the foregoing without further explanation here.

What I claim as new, and desire to secure by Letters Patent of the United States, is—

1. In a railway snow-plow the combination of a main plowshare extending obliquely across the track-rail; an extension-plate mounted upon and adjustable endwise of said main plowshare and provided with longitudinal slots extending nearly the entire length thereof; a plurality of headed studs or bolts set in fixed positions in said main plowshare and engaging said slot to serve only as supports and guides for said plate; and a separate bolt and hand-nut for clamping said plate in the desired adjusted position.

2. In a railway snow-plow, the combination of a main plowshare extending obliquely across the track-rail; an extension-plate mounted upon and adjustable endwise of said main plowshare and having a slot or slots extending longitudinally nearly the entire length thereof; a plurality of studs or bolts set in said main plowshare and engaging said slot or slots with heads outside of said plate; means for clamping said plate in the desired adjusted position; and a chambered housing or guard covering each of said slots and the heads of said studs or bolts.

3. In a railway snow-plow the combination with a main plowshare extending obliquely across the track-rail; of an extension-plate mounted upon the front end of said main plowshare and adjustable endwise thereon; means for guiding said plate in its endwise adjustments; a clamping device for securing said plate in its adjusted position; and a movable hook-plate carried by said adjustable share-plate and arranged to engage the upper edge of said main plowshare.

In testimony whereof I have signed my name to this specification, in the presence of two subscribing witnesses, on this 30th day of December, A. D. 1896.

EDWARD C. COLLINS.

Witnesses:
GEORGE H. SWIFT,
FRED H. NOYES.